(No Model.)

C. A. RICHARDS & D. T. FRENCH.
ANIMAL RELEASING DEVICE.

No. 374,321. Patented Dec. 6, 1887.

Witnesses.
Wm. P. Harvey,
Geo. Willis Pierce,

Inventors.
Calvin A. Richards
Dennis T. French

UNITED STATES PATENT OFFICE.

CALVIN A. RICHARDS AND DENNIS T. FRENCH, OF BOSTON, MASSACHUSETTS.

ANIMAL-RELEASING DEVICE.

SPECIFICATION forming part of Letters Patent No. 374,321, dated December 6, 1887.

Application filed February 28, 1887. Serial No. 229,147. (No model.)

*To all whom it may concern:*

Be it known that we, CALVIN A. RICHARDS and DENNIS TAYLOR FRENCH, both residing at Boston, in the county of Suffolk and State of Massachusetts, have invented certain Improvements in Animal Hitching and Releasing Devices, of which the following is a specification.

Our invention relates to improvements in animal-releasing devices, and has for its object to provide means whereby one or more animals hitched in their stalls or standing-room may be unhitched therefrom singly or may all of them be released at once, as is essential and desirable whenever the inclosing building is on fire or for any other cause necessitating the immediate removal of the animals from the building.

Figure 1:
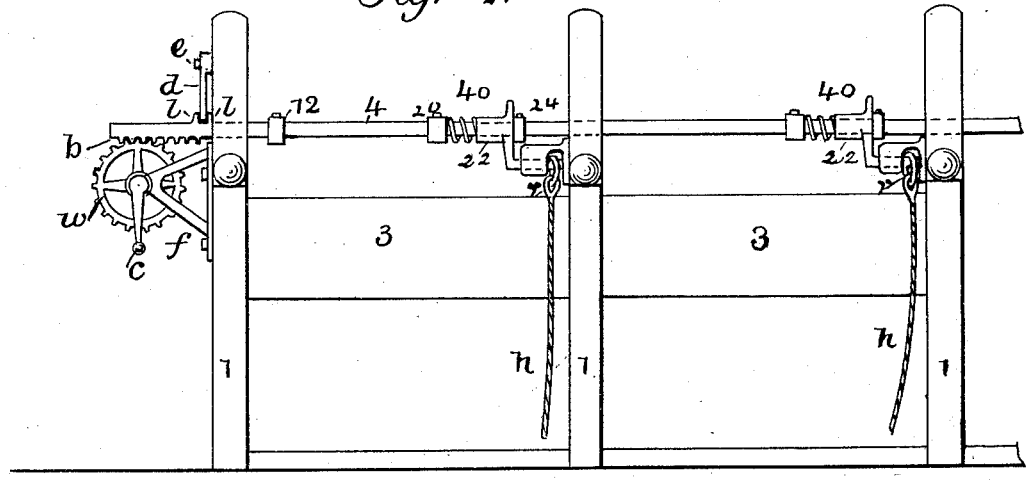
Figure 2:
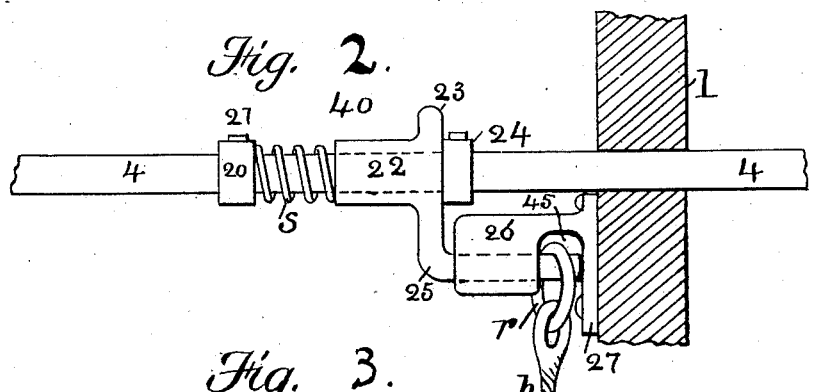
Figure 3:
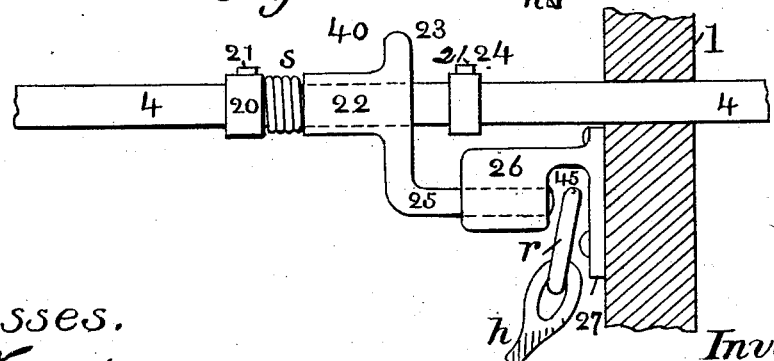

In the accompanying drawings, forming a part of this specification, Figure 1 is a front elevation showing the partitions which form stalls for animals and the holding and detaching devices. Fig. 2 is an enlarged view of the holding device. Fig. 3 is a similar view showing the holding device in a different position.

The numeral 1 represents the partitions between stalls.

4 is a rod extending through all the stalls, and mounted so as to have a longitudinal movement.

3 indicates a brace or trough extending across the stalls.

$h$ represents a halter, and $r$ a ring thereon.

The rod 4 can be moved lengthwise by turning the wheel $w$, said wheel having teeth engaging rack $b$ at the end of rod 4. The rod 4 is held against movement until the proper time by a catch, $d$, which is pivoted at $e$, and swings into position between stops $l$ on the rod. The wheel $w$ is supported on bracket $f$, and may be turned by crank $c$. The stop 12 prevents too great movement of the rod. The rod 4 has bolts 25, connected to sleeves 22 on the rod. The bolts 25 fit in sockets 26, which sockets receive rings $r$ between the shoulders 26 and 27. The bolts may be moved lengthwise of the rod by pressing back spring $s$ against collar 20, when it is desired to release a single animal the bolt 25 being pressed back by hand. When it is desired to release all the animals at once, the bar 4 is drawn lengthwise and moves all the bolts.

As shown in Fig. 1, we arrange a rack-gear on the outer end of the bar 4, into the teeth of which meshes the teeth of the spur-gear $w$, which is hung in the frame $f$, secured to the side of the outer partition, 1. The gear $w$ is rotated by the crank $c$. We arrange a series of gears, if desirable to secure power.

To prevent end motion of the bar 4 there are provided lugs $l\,l$ on the upper side thereof, between which hangs the pendulum-lever $d$, which is secured by and swings on the bolt $e$. This pendulum $d$ is swung out from between the lugs $l\,l$ when the crank $c$ is to be turned and the rod 4 pulled. An adjustable collar, 12, on the bar 4 prevents it from being pulled out too far, as also in Fig. 1 the collar strikes against the inner face of the end partition when the limit is reached.

The individual releasing device is constructed as follows: In each stall on the bar 4 are secured two collars, 20 and 24, by means of set-screws 21. Between them is the block 22, made to embrace and slide on the bar 4. Between the block 22 and the fixed collar 20 is a stout spiral spring, $s$, which presses the block 22 firmly against the fixed collar 24. The block 22 has a horn, 23, on its upper side, for a purpose to be explained hereinafter, and from its under side drops and then extends parallel with the bar 4 the bolt 25. Attached to the side of the stall-partition 1 is a keeper, 26, through which the bolt projects into the space 45 to the base 27 thereof.

In the use of this device a hitching-strap, $h$, is permanently attached to the headstall of the animal to be hitched, (or to his neck-strap,) and when he is led into the stall the horn 23 of the block, with the block, is forced back against the pressure of the spring $s$, pulling the bolt 25 away from the base 27 and out from the space 45, as shown in Fig. 3. The ring $r$ of the hitching-strap is inserted into the said space 45, the horn 23 is released, and the spring $s$ forces the block 22 and bolt 25 back through the ring $r$, securing the animal.

The process of releasing a single animal is similar to that just described for securing him. The horn 23 being forced back, pulling the bolt away from the base 27 and space 45, the ring $r$ falls by its own gravity, and the animal is free to be led out.

We claim—

The combination, with a series of stalls for animals, of a bar passing from side to side through all the stalls, the collars 20 and 24, and block 22, having the bolt 25 integral therewith, adjustable on said bar, the spring S, interposed between the collar 20 and block 22, a pinion engaging a rack upon said bar, and a retaining-catch engaging the bar to prevent longitudinal movement thereof, substantially as described.

In testimony whereof we have signed our names to this specification, in the presence of two subscribing witnesses, this 25th day of February, 1887.

CALVIN A. RICHARDS.
DENNIS T. FRENCH.

Witnesses:
WM. P. HARVEY,
GEO. WILLIS PIERCE.